United States Patent
Seiffert et al.

[11] 3,897,963
[45] Aug. 5, 1975

[54] PASSIVE SAFETY DEVICE FOR A VEHICLE

[75] Inventors: Ulrich Seiffert, Braunschweig; Burckhard Strüwe, Fallersleben, both of Germany

[73] Assignee: Volkswagenwerk Aktiengesellschaft, Wolfsburg, Germany

[22] Filed: Oct. 31, 1973

[21] Appl. No.: 411,190

[30] Foreign Application Priority Data
Nov. 10, 1972  Germany.......................... 2254952

[52] U.S. Cl...... 280/150 SB; 24/230 A; 24/201 TR; 297/389; 297/388
[51] Int. Cl.² ................ B60K 21/10; A44B 11/26
[58] Field of Search..... 24/230 A, 230 AU, 201 TR, 24/230 AK, 230 AL, 230 AN, 230 AM, 230 AP, 230 R; 280/150 SB; 297/389

[56] References Cited
UNITED STATES PATENTS
| | | | |
|---|---|---|---|
| 2,522,790 | 9/1950 | Johnston | 24/230 A |
| 2,904,347 | 9/1959 | Tucker | 24/230 A |
| 3,165,806 | 1/1965 | Lehman | 24/230 A |
| 3,237,265 | 3/1966 | Florian | 24/230 A |
| 3,524,679 | 8/1970 | DeLavenne | 24/230 A |

FOREIGN PATENTS OR APPLICATIONS
1,419,811  10/1965  France ................. 24/230 A

*Primary Examiner*—Bernard A. Gelak
*Attorney, Agent, or Firm*—Brumbaugh, Graves, Donohue & Raymond

[57] ABSTRACT

A passive safety device for a passenger in an automobile includes a shoulder safety belt extending diagonally across the passenger's body and fastened at one end to a door of the automobile. When the door is closed, therefore, the belt is automatically positioned about the passenger's body. The safety belt is divided into two lengths and the lengths are joined together by the male and female parts of a buckle. A catch in the female buckle part engages a cutout in the male buckle part to hold the parts and the belt lengths together. The two parts of the buckle are also rigidly connected by a shear pin that prevents the parts from separating even though the catch may be disengaged from the cutout. When a load exceeding a predetermined release load is applied to the safety belt, in an accident, for example, the shear pin is sheared off and the buckle parts can then be separated to release the passenger from the safety belt.

6 Claims, 4 Drawing Figures

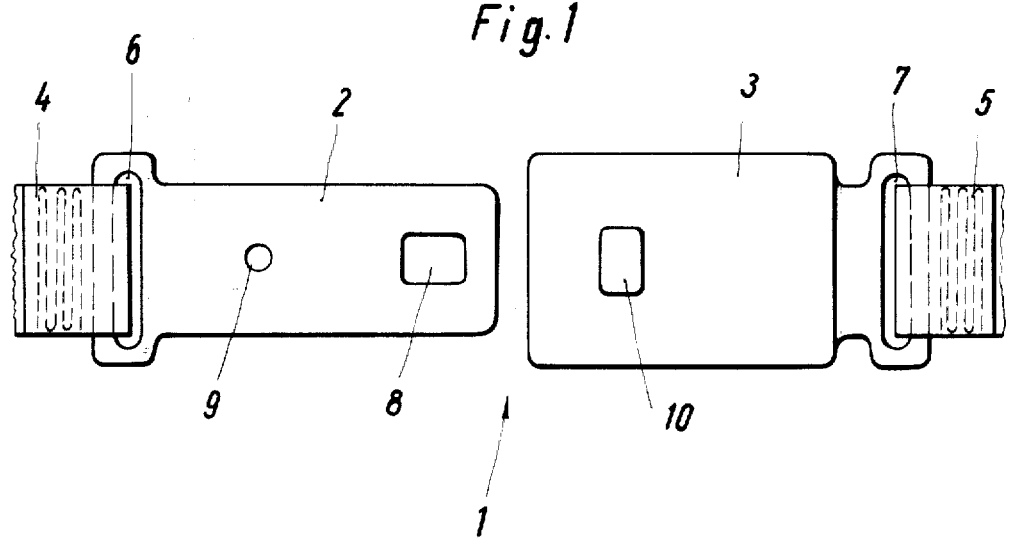
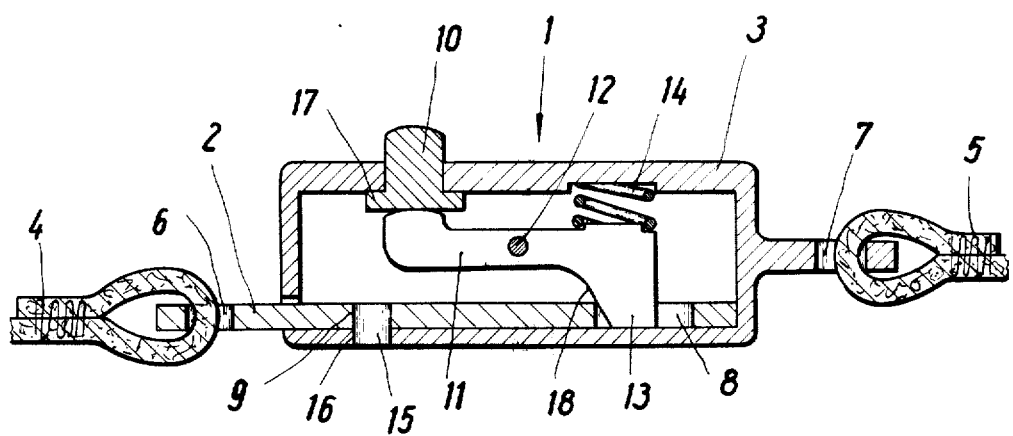

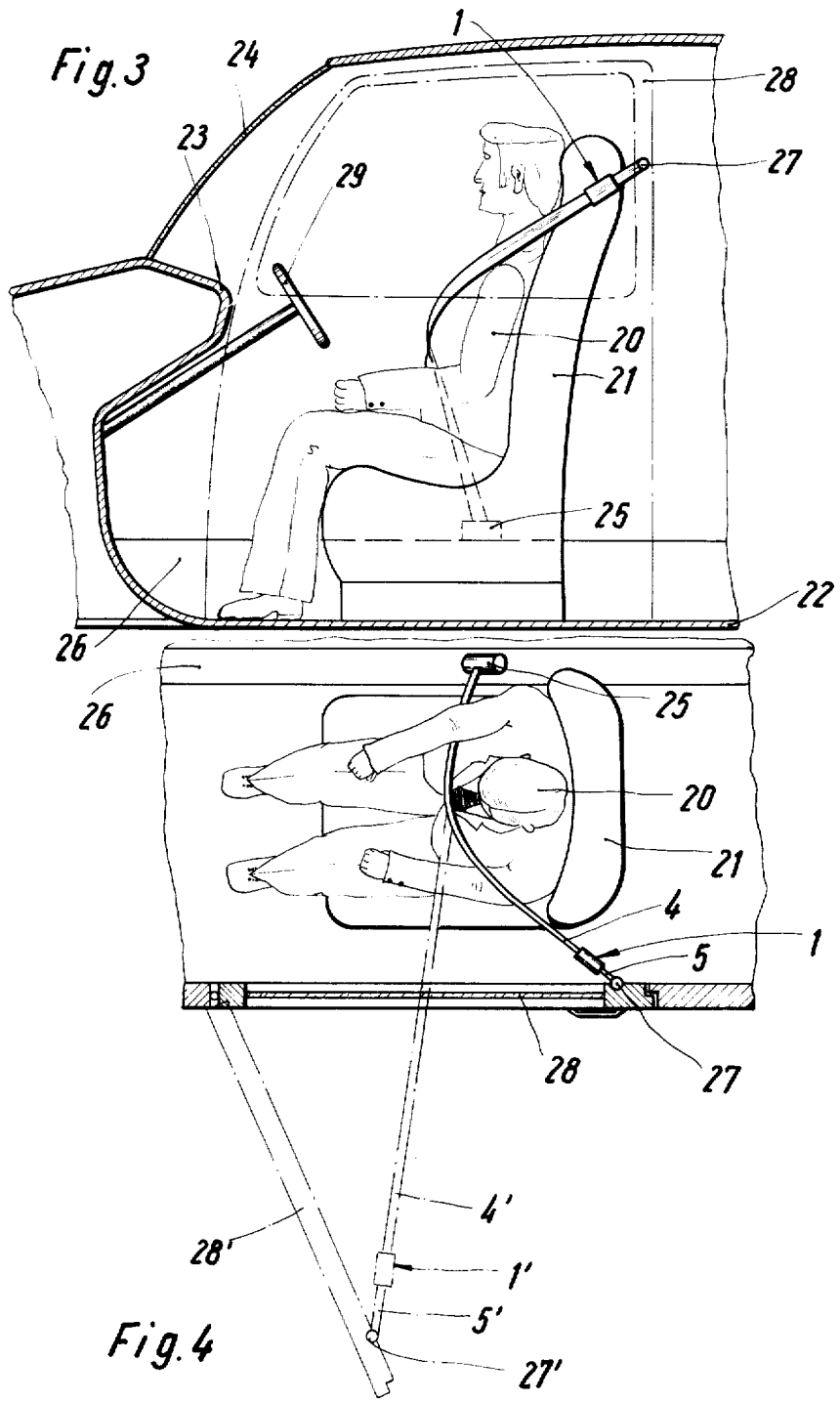

PASSIVE SAFETY DEVICE FOR A VEHICLE

BACKGROUND OF THE INVENTION

The most widely used device for protecting a passenger in a vehicle, such as an automobile, from being thrown against parts of the vehicle interior in the event of an accident is a safety belt that straps the passenger firmly to his seat. Safety belts may be categorized into two general classes: two-point safety belts and three-point safety belts. A two-point safety belt includes a single belt or strap, the ends of which are attached to the vehicle frame or chassis at two points, located one on either side of a vehicle seat. The belt is generally arranged to extend across a passenger's lap, but may instead extend diagonally across his body from one shoulder to the opposite hip. A three-point safety belt includes two belts or straps joined together so that only three connections are necessary to secure the ends of the belts to the vehicle. Generally, a three-point belt is a combination lap and diagonal shoulder belt.

In order for a safety belt to be effective, it must be properly adjusted and fastened around a passenger sitting in an associated seat. The typical automobile safety belt, therefore, is provided with an adjustably positioned, releasable buckle so that the passenger may fasten and adjust the belt about his body after he is seated. Nonetheless, many people regard having to fasten and adjust a safety belt as an annoying inconvenience, and thus the effectiveness of a safety belt is often wasted because passengers do not use it.

To eliminate the inconvenience of having to fasten a safety belt, one end of the belt is sometimes mounted on an adjacent automobile door. When the door is opened, the safety belt swings away from its associated seat to allow a passenger to enter or leave the automobile without handling the belt. When the door is closed, the safey belt swings into position about its associated seat and the body of a passenger who may be seated in it. The additional length of safety belt necessary for the arrangement is taken up on an automatic winding spool when the door is closed. The automatic take-up also assures a close engagement of the belt with the passenger's body. A locking mechanism on the spool prevents the belt from unwinding when an impact load is applied to the belt as a result of a collision. Such a safety belt arrangement which does not require the user to buckle or unbuckle the belt is commonly designated a passive safety device.

Another passive safety device has one end of the safety belt attached to a movable guide. The guide travels in a track mounted on the automobile frame and is moved by a small motor. As it travels along the track, the guide carries the safety belt toward or away from its associated seat.

In a conventional passive safety device, such as described above, the safety belt does not have a belt buckle but extends continuously from one point of attachment to the other. While a continuous belt is normally advantageous because a passenger can not carelessly or deliberately leave it unbuckled, the winding spool, or similar mechanism, for the belt might jam, as the result of an automobile accident, so that the belt could not be unwound from the spool. The belt would then effectively trap a passenger in his seat and, because the belt is attached at one end to the adjacent automobile door, also prevent escape by the passenger or access by rescue personnel through the door. Thus, the possible difficulties in freeing a passenger, particularly if injured or unconscious, from an automobile involved in an accident are considerably increased.

SUMMARY OF THE INVENTION

The present invention is directed to a passive safety device for a passenger in a vehicle, such as an automobile, which provides the convenience of conventional passive safety devices, while avoiding the difficulties described above that might arise from an accident. A passive safety device according to the invention includes a safety belt divided into two portions that are joined by a releasable coupling. The coupling permits the two portions of the safety belt to be separated from each other, just as in a conventional, non-passive safety belt. A passenger using the safety belt can thus be released from the belt in the event the winding spool, or a similar mechanism, for the belt is jammed as the result of an accident. To prevent separation of the two portions of the safety belt during normal use of the passive safety device, a locking element in the device overrides the releasability of the coupling until a load is exerted on the safety belt exceeding a predetermined release load. The predetermined release load is selected so that it is less than impact loads normally exerted on a safety belt when in use during a vehicle accident.

In a preferred embodiment of the invention, the releasable coupling includes a male and a female part attached to different portions of the safety belt. The locking element is a shear pin rigidly connecting the male and female coupling parts and maintaining them in engagement with each other.

The male part of the releasable coupling has a cutout that is engaged by a lug provided on a catch in the female coupling part. The cutout, however, extends lenthwise of the safety belt a distance greater than the corresponding dimension of the lug. The excess length of the cutout is equal to a dimension of the shear pin measured lengthwise of the safety belt in a shear plane of the pin. Thus, the male and female coupling parts can move relative to each other to permit shearing of the shear pin without disengaging the catch lug from the cutout or permitting separation of the two portions of the safety belt. The shear strength of the shear pin is preferably selected so as to be less than the shearing load normally applied on the pin through the safety belt and buckle as the result of an impact load exerted on the belt when in use in an accident.

The usefulness of the invention is enhanced by having the releasable coupling located in a zone adjacent a fastening point for the safety belt on the vehicle door. The coupling is then accessible to rescue personnel through the window in the door to release an injured or unconscious passenger from the safety belt in the event of an accident.

The preferred embodiment of the invention not only avoids the potential dangers and difficulties inherent in conventional passive safety devices but also permits the adaptation of existing automobile safety hardware for use in the invention. Specifically, a conventional safety belt buckle normally includes a male part provided with a cutout and the cutout can easily be extended to accommodate shearing of a shear pin. The shear pin of the preferred embodiment can also be conveniently incorporated into a conventional buckle by drilling holes at corresponding positions in the two parts of the buckle. With the pin in place, the buckle is ready for use in a passive safety device according to the invention.

BRIEF DESCRIPTION OF THE DRAWINGS

For a better understanding of the invention, reference may be made to the following description of an exemplary embodiment, taken in conjunction with the figures of the accompanying drawings, in which:

FIG. 1 is a plan view of a safety belt buckle for a passive safety device according to the invention, the two parts of the buckle being disengaged;

FIG. 2 is a sectional view of the belt buckle of FIG. 1, the two parts of the buckle being engaged;

FIG. 3 is a partial sectional view of a passenger seated in an automobile equipped with a passive safety device according to the invention; and FIG. 4 is a plan view of the left side of the automobile shown in FIG. 3.

DESCRIPTION OF AN EMBODIMENT

FIGS 1 and 2 of the drawings illustrate two portions 4 and 5 of a safety belt for use in a passive safety device according to the present invention. The portions 4 and 5 of the belt are joined together by a buckle, generally designated 1. The safety belt buckle 1 includes a male part 2 and a female part 3 into which the male part is inserted. The male buckle part 2 is attached to the left-hand portion 4 of the safety belt by a loop in the belt passing through an eye 6 in one end of the buckle part. The right-hand portion 5 of the safety belt is similarly looped through an eye 7 in one end of the female buckle part 3.

As shown in FIG. 2, the female part 3 of the buckle 1 resembles a hollow rectangular box. A slot in the free end of the female buckle part 3 adjacent the surface thereof presented to a passenger's body receives the free end of the male buckle part 2. Formed in the free end of the male buckle part 2 is a cutout 8 that is engaged by part of a catch 11 mounted within the female buckle part 3.

The catch 11 in the female part 3 of the buckle 1 is pivotally mounted on a bolt or pin 12 extending across the female buckle part through its center. A lug 13 projects from one side of the catch 11 adjacent one end to engage the cutout 8 in the male buckle part 2. The lug 13 is biased into engagement with the cutout 8 by a spring 14 located on the opposite side of the catch 11 from the lug 13, but at the same end of the catch. The spring 14 is held in place by a raised portion of the catch 11, which fits inside the coils of the spring 14 at one end, and by a recess in an interior surface of the female buckle part 3, which engages the spring at its other end. The face 18 of the lug 13 presented to the free end of the male buckle part 2 is tapered so that the end of the buckle part lifts the lug out of the way when being inserted into the female buckle part.

To permit release of the lug 13 from the cutout 8 in the male buckle part 2, a release button 10 projects through an opening formed in the top of the female buckle part 3. The interior end of the button 10 contacts the catch 11 at the end thereof opposite the lug 13 and carries a flange 17 that prevents the button from falling out of the opening in the female buckle part 3. The exposed end of the button 10 is raised above the outer surface of the top of the female buckle part 3 and can be manually operated. Downward pressure on the button 10 pivots the catch 11 about its mounting pin 12 and lifts the lug 13 out of engagement with the cutout 8.

Intermediate the free end of the male buckle part 2 and the eye 6 in the male buckle part, a hole 9 is drilled to accommodate a shear pin 15. A similar hole 16 is drilled in the female buckle part 3 so that the holes 9 and 16 are aligned when the male buckle part 2 is fully inserted into the female buckle part. When inserted into the aligned holes 9 and 16, the shear pin 15 overrides the releasability of the buckle parts 2 and 3 and prevents the two buckle parts from disengaging one another even through the release button 10 is depressed and the lug 13 in the catch 11 is lifted free of the cutout 8 in the male buckle part. The shear pin 15 thus prevents a passenger from carelessly or deliberately leaving the buckle 1 unbuckled and thereby defeating the purpose of the passive safety device in which the buckle 1 is used.

To permit the male and female buckle parts 2 and 3 to be disengaged to release a passenger after an accident, the shear pin 15 is designed to shear off during the accident. Specifically, the shear strength of the shear pin 15 is such that the pin will shear off when an impact load is exerted on the safety belt exceeding a predetermined release load. The release load is selected so that it is not greater than the impact load that is normally applied to a safety belt when in use in an automobile involved in an accident. For example, since a force of approximately 7,000 N on a safety belt is normal in an impact accident, the shear pin 15 may, for example, be designed to shear off when a force of approximately 1,000 N is exerted on the belt. When the shear pin 15 is sheared off, the two protions 4 and 5 of the safety belt may be separated from each other by depressing the release button 10 and disengaging the buckle parts 2 and 3. In the event of an accident in which a take-up spool for the safety belt is jammed or a similar mechanical failure occurs, the mechanical failure will not interfere with a passenger leaving or being removed from the automobile.

To permit the shear pin 15 to be sheared off, as required by the invention, the cutout 8 in the male buckle part 2 is made longer than would otherwise be necessary for engagement of the lug 13 with the cutout. The length of the cutout permits relative movement between the male and female buckle parts 2 and 3 for shearing of the pin 15 without disengagement of the two buckle parts. The additional length of the cutout 8 should at least be equal to the diameter of the shear pin 15 in the plane in which shearing is intended.

Although the belt buckle 1, as described above and illustrated in FIGS. 1 and 2, may be located at any position along the length of a safety belt, the buckle should preferably be located in a zone adjacent the point of attachment of the safety belt to the door of the automobile. Such a location not only keeps the buckle 1 out of the way of the passenger using the belt, but also locates the buckle 1 adjacent a window in the automobile door to permit convenient access by rescue personnel, for example, outside the automobile.

As shown in FIGS. 3 and 4, a man, generally designated 20, is seated in the driver's seat 21 of a passenger automobile. In front of the man 20, the frame 22 of the automobile has been configured to provide an instrument panel or dashboard 23. Immediately above the instrument panel 23 is windshield 24 that extends to the roof of the automobile. The steering wheel 29 for the automobile is mounted on a column extending from the frame 22 underneath the instrument panel 23.

In accordance with the present invention, the man 20 is held in the seat 21 by a passive safety device including a two-point safety belt. The safety belt is a shoulder belt which is attached to the automobile on each side of the seat 21 and extends diagonally across the man 20 from his left shoulder to his right hip. the lower or right-hand end of the safety belt is secured to the tunnel or hump 26 through which extends the drive shaft (not shown) for the automobile. An automatic winding or take-up spool 25 is mounted on the drive shaft tunnel 26 automatically to wind up any excess length of the safety belt which is not in use. The winding spool 25 may be of any conventional type that can be conveniently used with a shoulder safety belt. The upper or left-hand end of the safety belt is attached to the automobile door 28 adjacent the seat 21 by a bracket 27. The bracket 27 is preferably located on the upper rear portion of the door 28, as viewed from the left side of the automobile. The safety belt is divided into two portions 4 and 5 joined together by a buckle 1, as described above and illustrated in FIGS. 1 and 2. The buckle 1 is located adjacent the bracket 27 for convenient access by rescue personnel, for example, through the window in the door 28.

When the door 28 to the automobile is open, as shown in phantom in FIG. 4, the safety belt is fully unwound from the spool 25 and assumes the position indicated in phantom to permit convenient and unhindered entry into or exit from the automobile. When the door 28 is closed, the safety belt automatically assumes its proper restraining position about the body of the man 20 seated in the seat 21. In the event of an impact load being applied to the safety belt, as in the event of a collision, a conventional locking device (not shown) associated with the winding spool 25 prevents the safety belt from unwinding and thus holds the man 20 securely against the automobile seat 21.

As previously indicated, the mounting bracket 27 could be formed as a guide carried in a track mounted on the automobile frame above the automobile door 28, for example. The guide would move longitudinally of the automobile in the track to engage or disengage the seat belt about the man seated in the seat. The safety belt buckle would still preferably be located adjacent the mounting bracket to permit convenient access by rescue personnel outside the automobile.

It will be understood that the above described embodiment is merely exemplary and that those skilled in the art may make many variations and modifications without departing from the spirit and scope of the invention. All such modifications and variations are intended to be within the scope of the invention as defined in the appended claims.

We claim:

1. A passive safety device for a passenger vehicle comprising:
   a. a safety belt extending transversely of an associated seat in the vehicle and adapted to engage a portion of the body of the passenger when seated in the seat, said safety belt being divided into two distinct portions;
   b. first means for permanently securing an end of one of said portions of said safety belt to an associated door on the vehicle, the door being movable so that said safety belt can be selectively engaged with and disengaged from the body of the passenger;
   c. second means for permanently securing an end of the other of said portions of said safety belt to the vehicle, said second securing means being spaced from said first securing means a distance equal to at least a portion of the width of the seat and in a direction transverse of the seat; and
   d. a sole releasable coupling mechanism including a male buckle part attached to the free end of one of said portions of said safety belt, said male buckle part having a cutout therein, a female buckle part adapted to receive at least a portion of said male buckle part and attached to the free end of the other of said portions of said safety belt, said female buckle part including catch means for engaging said male buckle part and actuating means for disengaging said catch means from said male buckle part, and a pin connected between said male and female buckle parts for maintaining said male and female buckle parts in engagement with each other until a load is exerted on said safety belt exceeding a predetermined release load, the predetermined release load being no greater than impact loads normally exerted on a safety belt when in use during a vehicle accident, said catch means including a lug engagable with and disengagable from said cutout in said male buckle part, said cutout extending lengthwise of said safety belt a distance greater than a corresponding dimension of said lug by a length at least equal to a dimension of said pin measured lengthwise of said safety belt in a shear plane of said pin, wherein relative movement between said male and female buckle parts is permitted for shearing said pin without disengagement of said male and female buckle parts until said actuating means is manually actuated.

2. The device of claim 1, wherein said first securing means is a bracket located at the upper rear portion of the door.

3. The device of claim 1, wherein said second securing means is a take-up spool mounted on an associated drive shaft tunnel in the vehicle for winding up any excess length of said safety belt not in use, whereby said safety belt fully unwinds from said spool when the door is open to permit the unhindered entry into or exit from the vehicle and automatically assumes a proper restraining position about the body of the passenger when the door is closed, said spool including a locking device for preventing said safety belt from unwinding during an accident, whereby said safety belt holds the passenger securely against the seat in the event of a collision.

4. The device of claim 1, further comprising a pin extending through said female buckle part for pivotally mounting said catch means therein, and a spring positioned in said female buckle part for biasing said lug of said catch means into engagement with said cutout.

5. The device of claim 4, wherein said actuating means is a button projecting through an opening in an outer surface of said female buckle part, said button capable of reciprocating movement in said opening in a direction perpendicular to a plane defined by said outer surface of said female buckle part, said button having a first end located internally of said female buckle part in contact with said catch means at the end thereof opposite said lug and a second end located externally of said female buckle part for manual depression, whereby upon manual depression of said second end said first end is further depressed into said female buckle part to pivot said catch means about said pin and lift said lug out of engagement with said cutout.

6. The device of claim 1, wherein said releasable coupling device is located adjacent said first securing means.

* * * * *